United States Patent [19]
Kirk

[11] Patent Number: 5,898,498
[45] Date of Patent: Apr. 27, 1999

[54] POINT INTERFEROMETER TO MEASURE PHASE SHIFT IN RETICLES

[75] Inventor: Joseph P. Kirk, Chelsea, N.Y.

[73] Assignee: International Business Machines Corp., Armonk, N.Y.

[21] Appl. No.: 09/005,614

[22] Filed: Jan. 9, 1998

[51] Int. Cl.⁶ ..................................... G01B 9/02
[52] U.S. Cl. ........................... 356/353; 356/359
[58] Field of Search .................... 356/345, 346, 356/353, 357, 359, 361

[56] References Cited

U.S. PATENT DOCUMENTS

| | | | |
|---|---|---|---|
| 4,976,542 | 12/1990 | Smith | 356/346 |
| 5,426,503 | 6/1995 | Kusunose | 356/353 |

Primary Examiner—Samuel A. Turner
Attorney, Agent, or Firm—Scully, Scott, Murphy & Presser; H. Daniel Schnurmann

[57] ABSTRACT

A device to measure a phase shift of a step in a reticle is disclosed. The phase shift measuring device has a common path interferometer for receiving light from a light source and providing two point images separated from each other by an adjustable distance. A microscope having an objective focuses two point images to form two focused points along a reticle surface of the reticle. The reticle is moved between first and second positions, wherein at the first position, light beams from the two focused points enter the reticle surface, and wherein at the second position, the light beams from the two focused points enter a step surface of the step A detector receives light from the reticle for detection of the step phase shift.

17 Claims, 5 Drawing Sheets

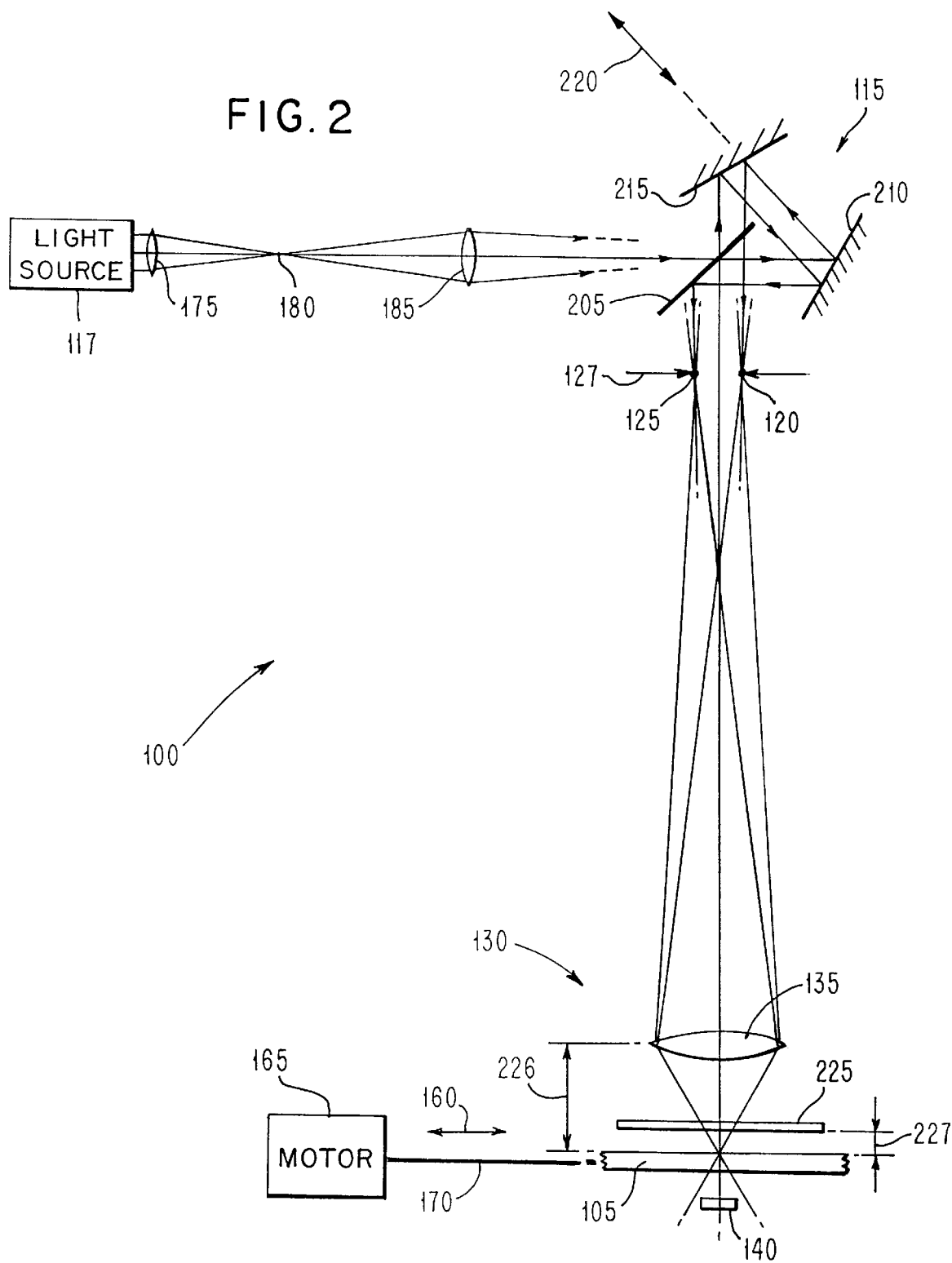

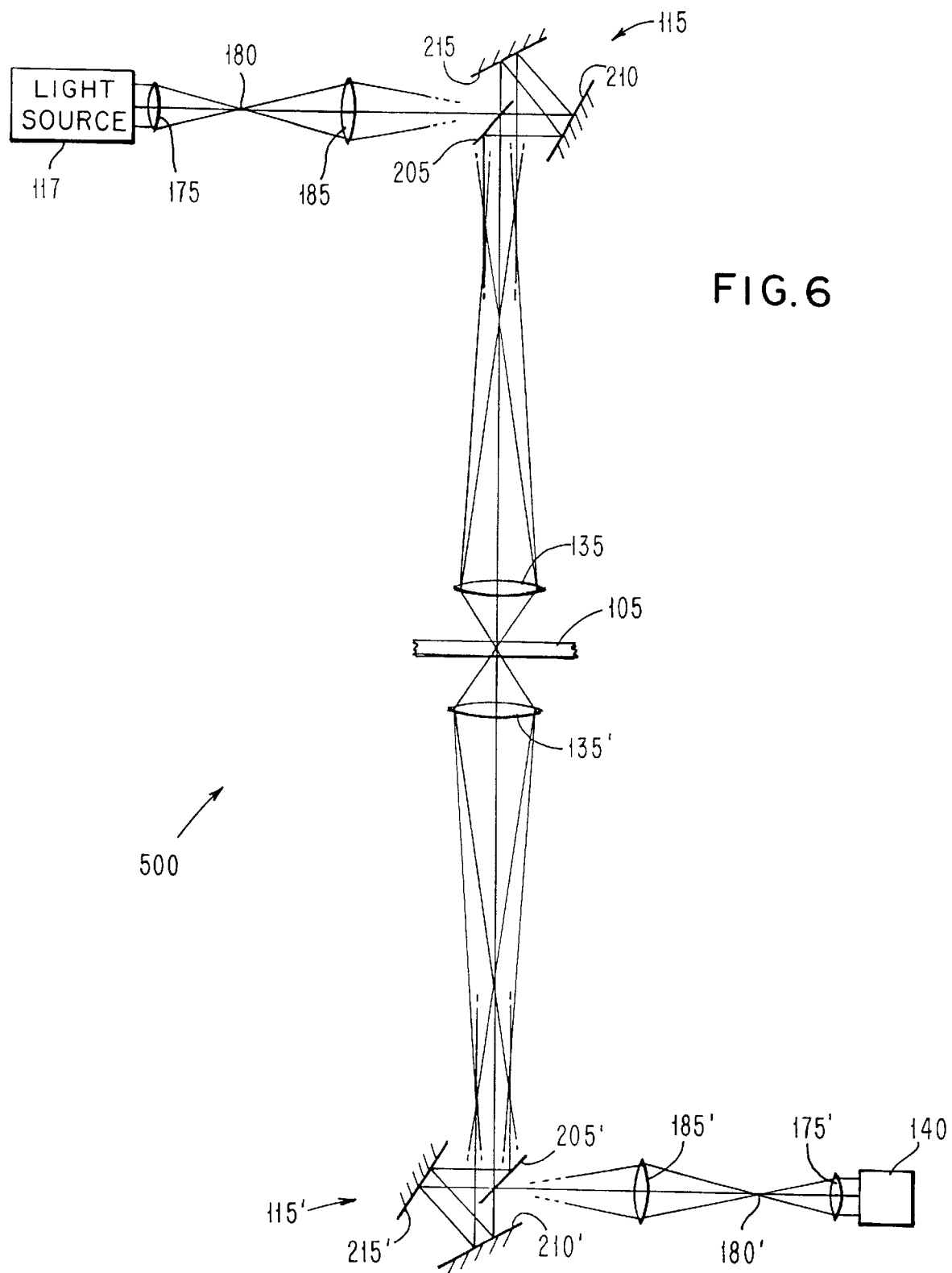

POINT INTERFEROMETER TO MEASURE PHASE SHIFT IN RETICLES

BACKGROUND OF THE INVENTION

1. Field of the Invention

The present invention is directed to a point interferometer to measure phase shifts in reticles, and more particularly, to a common path image shearing interferometer that provides two point images with adjustable separation therebetween.

2. Discussion of the Prior Art

FIG. 1 shows a reticle 10 which is used during the manufacture of integrated circuits. For example, reticles are used to pattern semiconductor material, which is later etched and processed to form various regions therein. Various types of lithography are used to pattern and etch semiconductor material, such as photo-lithography and phase shift lithography. During phase shift lithography, a reticle is used as a mask over the semiconductor material.

The reticle causes a phase shift of light passing therethrough. In particular, incident light 12 enters an entrance surface 14 of the reticle 10, passes therethrough, and emerges from an exit surface 16 as an exit light 18. Due to the thickness 20 of the reticle 10, i.e., the distance traveled by the light within the reticle 10, the phase of the incident light 12 is different from the phase of the exit light 18.

For use in lithography, the entrance surface 14 of the reticle 10 is patterned to have depressions or steps, referred to as phase steps 22. The reduced thickness 24 of the reticle 10 below the phase step 22 provides a phase shift of the incident light which is different from the phase shift caused by the thicker portion 20 of the reticle 10.

In particular, light 26 incident on the phase step 22 emerges from the reticle as a step exit light 28. The light 26 incident on the phase step 22 has the same phase as the light 12 incident on the reticule's main or entrance surface 14. However, due to the difference in the distances traveled within the reticle 10, the two exit lights 18, 28 have different phases. Thus, different portions of the exit light have different phase shifts, depending on the distance traveled in the reticle; light 26 entering the phase step 22 travels a shorter distance 24 in the reticle 10, than the distance 20 traveled by light 12 entering the upper or main entrance surface 14 of the reticle 10.

Manufacturing smaller semiconductor devices, requires a decrease in the areas of different phase steps of a reticle. The decreased areas and increased density of adjacent phase steps present difficulties in measuring the phase steps on the reticle. For example, an area of interest on the reticle may be less than a micron. To spatially resolve such small areas requires an optical interferometer operating at a high numerical aperture (NA).

Further, the wavelengths at which the measurement must be made are also decreasing, such as 190 nm. The small phase step areas and short wavelengths limit the choice of lenses and interferometers. This is because the lenses and interferometers must simultaneously allow deep ultra-violet (DUV) transmission and have a high numerical aperture (NA). Conventional interferometers cannot properly measure phase shifts when the phase shift areas or steps of a reticle are small and close together. Rather, conventional interferometers are used to measure the phase on the reticle using relatively large areas.

SUMMARY OF THE INVENTION

The object of the present invention is to provide a device to measure a phase shift of a step in a reticle that eliminates the problems of conventional phase shift measuring devices.

Another object of the present invention is to provide a device that simultaneously allows deep ultra-violet (DUV) transmission and has a high numerical aperture (NA).

Yet another object of the present invention is to provide a device which measures phase shifts of sub-micron phase shift areas of a reticle.

These and other objects of the present invention are achieved by a phase shift measuring device which includes a common path interferometer for receiving light from a light source and providing two point images separated from each other by an adjustable distance. A microscope having a least one objective focuses two point images to form two focused points along a reticle surface of the reticle.

The phase shift measuring device has means for moving the reticle between first and second positions, wherein at the first position, light beams from the two focused points enter the reticle surface, and wherein at the second position, the light beams from the two focused points enter a step surface of the step. A detector receives light from the reticle for detection of the step phase shift.

The common path interferometer includes a cyclic beam splitter having a partially transmissive and partially reflective surface. Further, the cyclic beam splitter has first and second reflectors. The partially transmissive and reflective surface transmits a first transmitted light to the first reflector, which reflects the first transmitted light to the second reflector as a first reflected light. In turn, the second reflector reflects the first reflected light to the partially transmissive and reflective surface for transmission to provide a first one of the two point images.

In addition to partially transmitting the incident light, the partially transmissive and reflective surface partially reflects the incident light as a third reflected light to the second reflector, which reflects the third reflected light to the first reflector as a fourth reflected light. In turn, the first reflector reflects the fourth reflected light to the partially transmissive and reflective surface for reflection to provide a second one of the two point images.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 2 shows a phase shift measuring device according to the present invention;

FIG. 6 shows a phase shift measuring device according to yet another embodiment of the present invention.

DETAILED DESCRIPTION OF THE INVENTION

Figure 1:
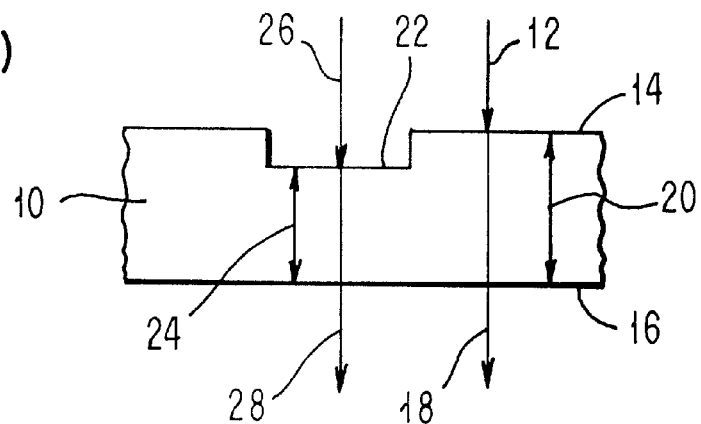
FIG. 1 shows a conventional reticle having a phase step.
Figure 3:
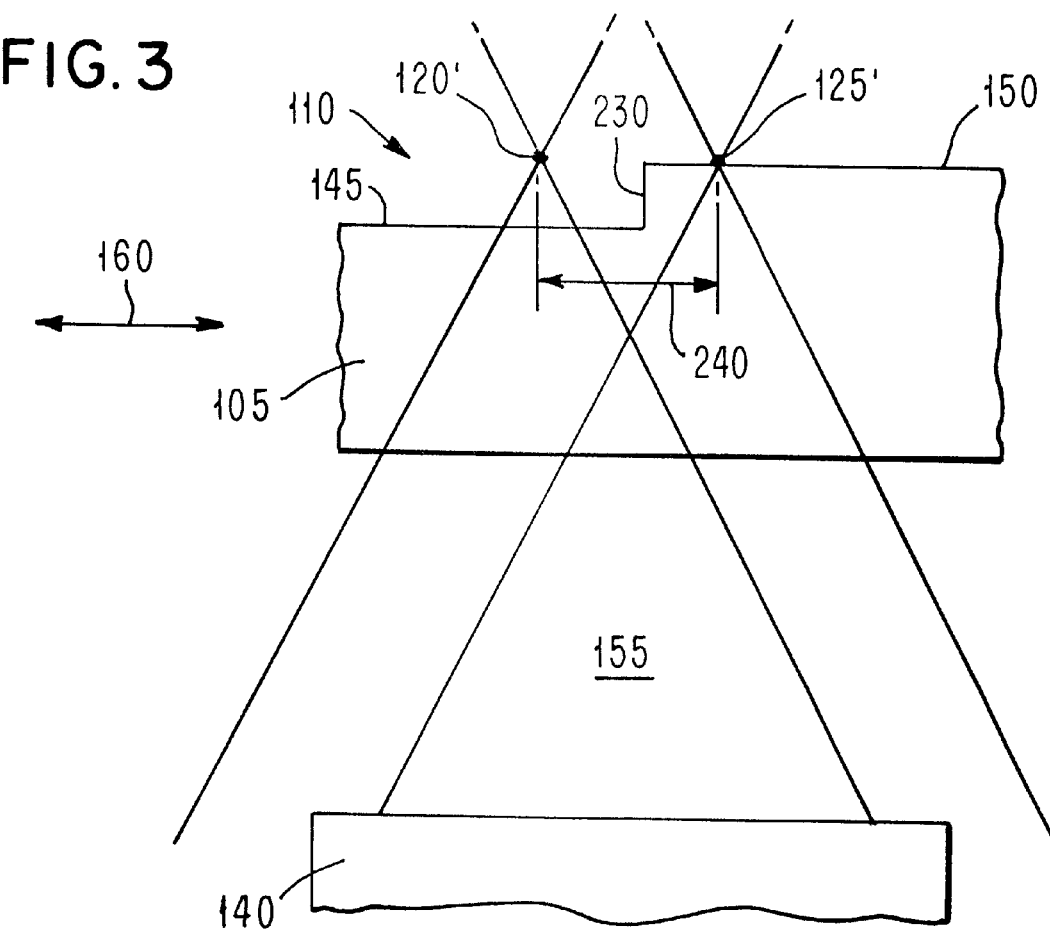
FIG. 3 shows paths of light beams passing through a reticle according to the present invention.

FIG. 2 shows a device 100 for measuring a phase shift due to a substrate or reticle 105 having a phase step 110, shown in FIG. 3. As shown in FIG. 2, the phase shift measuring device 100 includes a common path interferometer 115 for receiving light from a light source 117. The common path interferometer 115 provides two point images 120, 125 which are separated from each other by an adjustable distance 127. A microscope 130 having at least one objective or lens 135 receives light beams diverging from the two point images 120, 125 and focuses the two point images 120, 125 onto the reticle 105, for passing therethrough and impinging onto a detector 140, such as a photo detector array. Light from the light source 117 illuminates a photo-detector array 140 after traveling through the interferometer 115, the microscope 130 and the reticle 105.

FIG. 3 shows in greater detail the illumination of the photo-detector array 140 by light beams passing through the reticle 105 having a phase step 110. The phase step 110 is a depression patterned into the reticle 105, where the surface 145 of the phase step 110 is lower than the surface 150 of the reticle 105. The two point images 120, 125 (FIG. 2) are focused by the microscope lens 135 onto two focused points 120', 125' on a plane of the reticle surface 150.

Light beams diverge from the two focused points 120', 125' and pass through the reticle 105. The photo-detector array 140 is located to receive overlapping light beams from the two focused points 120', 125'. The region where the diverging light beams from the two focused points 120', 125' overlap is shown as reference numeral 155 in FIG. 3. The detector 140 detects interference fringes of light in the overlapping region 155.

The reticle 105 is moved along a lateral direction 160 using, for example, a motor 165 connected to the reticle 105 through an arm 170, shown in FIG. 2, which also supports the reticle 105. The photo-detector array 140 records the change in interference pattern when the reticle under test 105 is moved so that the two focused points 120', 125' move across the phase step 110 being measured.

The source 117 supplies light at the same wavelength used during phase shift lithography where the phase shifting reticle is to be used. This source 117 is preferably a laser but can be any source with sufficient brightness to supply an adequate signal to the photo-detector 140. It should be noted that in this embodiment, the interferometer 115 includes a cyclic beam splitter and provides nearly common paths through the microscope optics 135 to the photo-detector 140 except for the phase step 110. For this reason, the source 117 can have a relatively large bandwidth.

As shown in FIG. 2, a focusing lens 175 focuses light from the light source 117 at a focal point 180 to form a point object. An imaging lens 185 images the point object through the cyclic beam splitter of the interferometer 115, which separates the point objet to form the two coherent images 120, 125 at the focal point of the imaging lens 185, where the coherent images 120, 125 are in phase.

The cyclic beam splitter of the interferometer 115 includes a partially reflecting mirror 205 and two reflectors 210, 215. The partially reflecting mirror 205 receives light beams from the imaging lens 185 to partially reflect and partially transmit the received light beams. The light beams transmitted through the partially reflecting mirror 205 are directed toward the first reflector 210. The first reflector 210 reflects the light transmitted through the partially reflecting mirror 205 toward the second reflector 215, which in turns, reflects these light beams back toward the partially reflecting mirror 205 to pass therethrough and form the first coherent image 120 at the focal point of the imaging lens 185.

The light beams reflected from the partially reflecting mirror 205 are directed toward the second reflector 215. The light reflected from the partially reflecting mirror 205 is also reflected by the second reflector 215 toward the first reflector 210, which in turns, reflects these light beams back toward the partially reflecting mirror 205 to reflect therefrom and form the second coherent image 125 at the focal point 190 of the imaging lens 185.

The light beams diverge from the two coherent images 120, 125 and form the two point images at the back focal plane of the microscope objective 135. It should be noted that because of the cyclic nature of the beam splitter, both coherent images 120, 125 have traveled the same optical distance to arrive at the focal point of the imaging lens 185.

The separation 127 of two coherent images 120, 125 at the focal point is adjusted by movement of the two mirrors 210, 215 of the cyclic beam splitter along a line 220 parallel to direction of propagation of light between the two mirrors 210, 215. Illustratively, the movement of the two mirrors 210, 215 is achieved manually or by using a motor connected to the two mirrors 210, 215 via arms, similar to the motor 165 and arm 170 used for moving the reticle 105. The separation 127 is adjustable from zero to large separations, while maintaining the common optical paths of the light beams forming the two coherent images 120, 125 from the light source 117 to the focal point of the imaging lens 185. The focal point of the imaging lens 185 is the location where the two coherent images 120, 125 are focused.

The separation 127 is only limited by the size of the partially reflecting mirror 205 as well as the size of the two reflectors 210, 215 of the cyclic beam splitter. Illustratively, this separation 127 is of the order of a few tens of microns, such as from 10 to 100 microns.

The microscope 130, which is represented by the objective 135, transmits the wave length of light used for measuring the phase shift of the reticle step 145 (FIG. 3), which wave length is typically short in the deep ultra-violet region, such as 190 nm. In addition, the microscope 130 is optically corrected for this wave length.

As the phase shifted areas decrease, such as the area of the reticle step 145 (FIG. 3), the numeric aperture (NA) of the microscope objective 135 necessary to resolve the small phase shifted areas increases. For example, to resolve a phase step having a dimension of less than 10 microns, the NA of the microscope objective 135 must be greater than 0.03. Further, for small step areas, the required clearance 226 between the reticle 105 and the lens 135 also decreases.

Typically, a transparent pellicle 225 is located within this clearance 226, between the reticle 105 and the lens 135. The pellicle 225 is at a distance 227 of approximately 10–20 mm from the reticle 105 and is used to protect the reticle 105 from being contaminated by dust particles or the like. As the clearance 226 decreases, eventually phase shift measurements cannot be made with the pellicle 225 in place. If the measurement must be made with the pellicle 225 in place, a long working distance microscope objective is used. However, such a microscope objective typically limits the numeric aperture, and prevents measurement of very small phase shifted regions.

In operation and referring to FIGS. 2–3, light is provided from the light source 117, and the two mirrors 210, 215 of the interferometer 115 are moved along the axis 220 to separate the two focused points 120', 125' at a desired distance for optimal phase shift detection by the detector 140. For example, the separation between the two focused points 120', 125' is adjusted to properly resolve the phase step 110 of the reticle and provide a proper overlapping region 155 to the detector 140.

Next, the reticle 105 is positioned so that the two focused points 120', 125' are on one side of the phase step 110, i.e., on the reticle surface 150 or on the phase step surface 145. In this initial position, an initial interference pattern 310 (FIG. 4) detected by the detector 140 is recorded and observed. Next, the reticle 105 is moved along the lateral axis 160 so that the two focused points 120', 125' become located over the other side of the phase step 110, for example, over the phase step surface 145 instead of the reticle surface 150.

Electronic recording of the phase step is done using the detector 140, which is a diode array for example. The detector 140 records the changes in the interference pattern formed by the light from the two focused points 120', 125' impinging on the detector 140 as the reticle 105 is moved in order for the phase step 110 to move past the two focused points 120', 125'.

Figure 4:
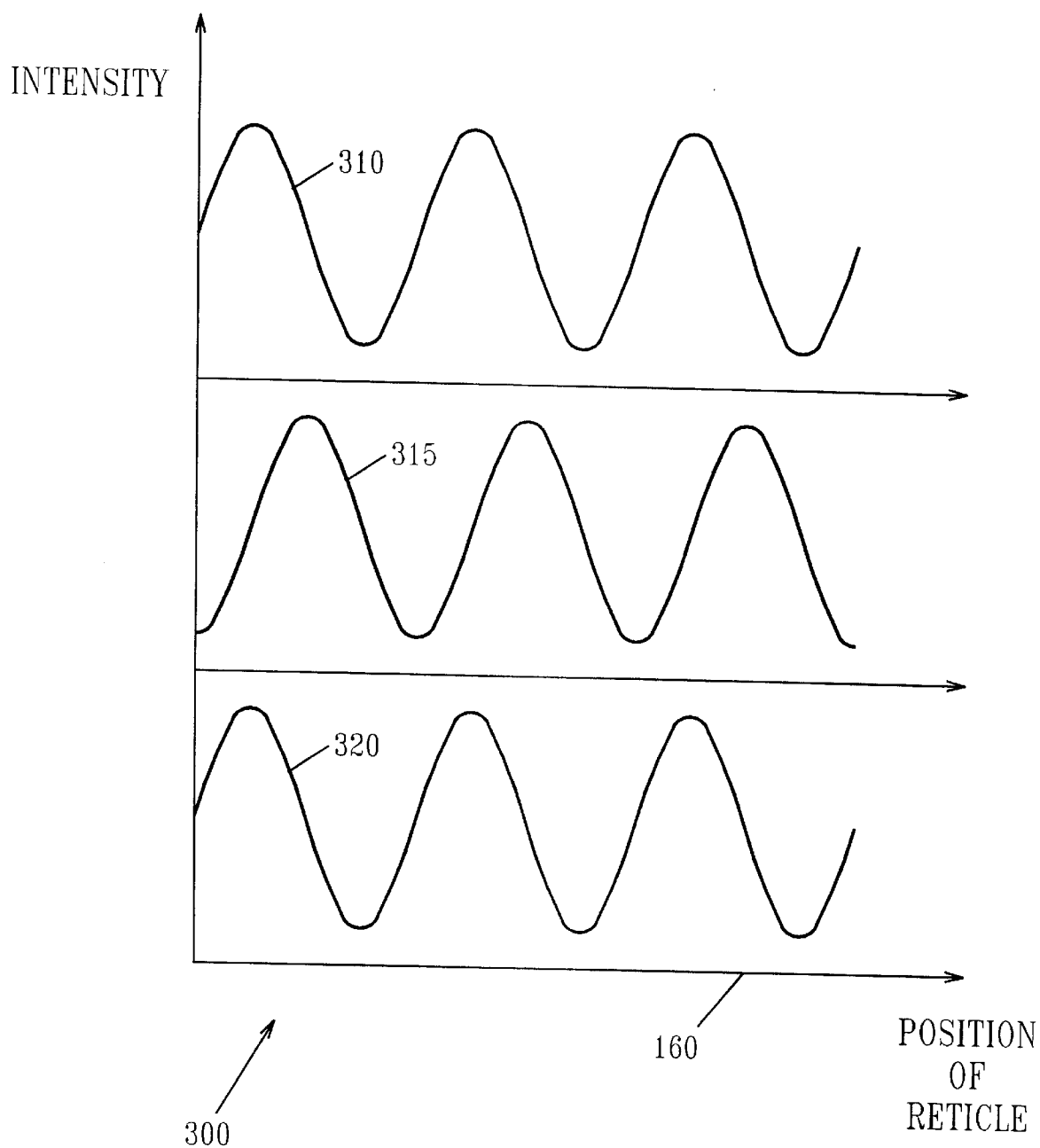
FIG. 4 shows interference patterns detected by the a phase shift measuring device according to the present invention.

FIG. 4 shows the interference patterns 300 of intensity versus the position of the reticle 105 along the lateral axis 160, also shown in FIGS. 2–3. The interference patterns 300 are formed by the light beams from the two focused points 120', 125' as they travel through the reticle 105 and impinge on the detector 140. Initially, reticle 105 is positioned where the two focused points 120', 125' are located over one side of the phase edge 230 (FIG. 3), such as over the reticle surface 150. In this initial position, the interference pattern detected by the detector 140 is shown FIG. 4 as reference numeral 310.

As the phase edge 230 (FIG. 3) is moved past one focused point 120', the intensity on the detector array 140 shifts to form a first shifted interference pattern 315. Next, as the phase edge 230 is moved past the other focused point 125', the intensity on the detector array 140 shifts again, but in the opposite direction, to form a second shifted interference pattern 320, which is shifted back to be in the same position as the initial interference pattern 310. This fringe movement is used to calculate the depth of the phase step 110 according to methods well known in the art.

It is noteworthy that two phase changes occur in opposite directions having opposite signs during the above described movement of the reticle. Thus, the difference in phase change obtained from these measurements is divided by two to yield the phase change due to the phase step. In particular, the total phase change $PC_{tot}$ is given by:

$$PC_{tot} = (PC_1 - PC_2)/2$$

where:

$PC_1 = -PC_2$;

$PC_1$ is the first phase change; and $PC_2$ is the second phase change.

Thus, as the two spots 120', 125' are scanned across the feature or phase step under test, the phase change between them is twice that of the phase step.

Tracking these phase shifts eliminates the need to establish an independent phase reference.

Since the phase measuring device 100 includes a common path interferometer, white light fringes will be formed if there is no phase shift between the light beams impinging on the detector 140 from the two focused points 120', 125'. This occurs when the two focused points 120', 125' are over same surface, such as over the reticle surface 150 or over the step surface 145.

Further, the common path interferometer 115 can be installed with any microscope, and the phase measuring device 100 will operated at any magnification. The common path features assure that conventional microscopes can be used with very little modification.

The test spots' separation 240 (FIG. 3) is adjusted by adjusting the position of the interferometer mirrors 210, 215 (FIG. 2), while the size of test spots 120', 125' is changed by choosing a microscope objective 135 having a desired numerical aperture. The adjustability of the test spots' size and separation allows measurement of various reticles with different phase step areas and densities.

It should be noted that, except for the loss in the beam splitter and optical transmission, all of the lights gets to the photo-detector 140. This increases efficiency and acromaticity, as well as the robustness of the phase measuring device for detecting reticle phase shifts.

Figure 5:
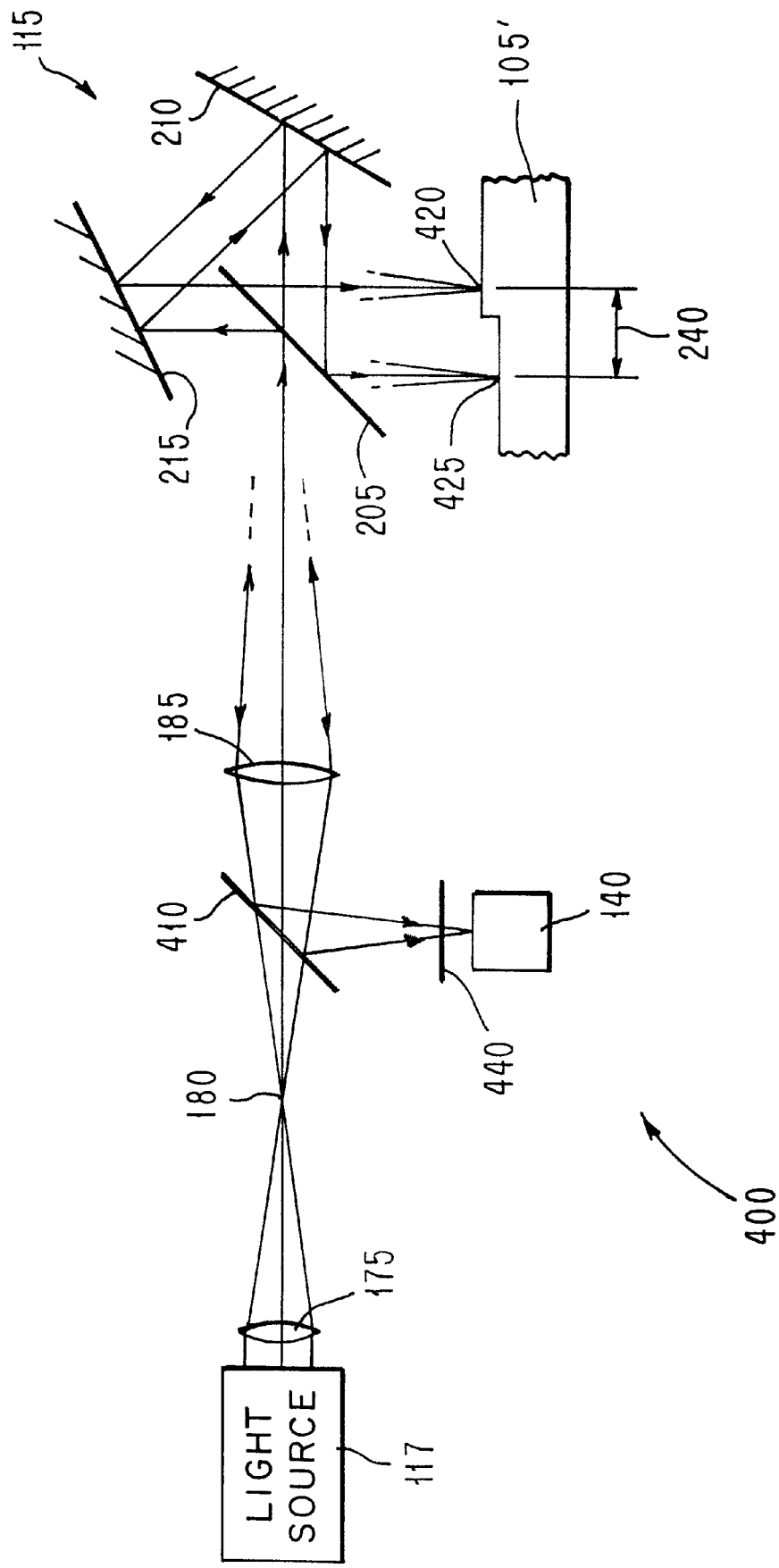
FIG. 5 shows a phase shift measuring device according to another embodiment of the present invention.

The above described device is used when the reticle 105 is transmissive. FIG. 5 shows a simplified phase measuring device 400 used with reflective reticles 105', so that the phase measurements are made in reflection. FIG. 5 is particularly useful when the areas of phase steps are relatively large, such as for phase steps having a diameter or length of greater than 10 microns. Unlike the device used for transmissive measurements, the high numeric aperture microscope objective 135 (FIG. 2) is not needed for phase measurement in reflection.

As shown in FIG. 5, the interference signal is recorded at the photo-detector 140 as a retro-reflection. Light reflects back from the reflective reticle 105' and retraces the same path of the light incident thereon. A second beam splitter 410 is provided between the focal point 180 of the focusing lens 175 and the imaging lens 185.

Similar to the beam splitter or partially reflecting mirror 205 of the interferometer 115, this second beam splitter 410 also partially transmits and partially reflects light incident thereon. Thus, light from the light source 117 is partially transmitted through the second beam splitter 410 toward the interferometer 115. Similar to that described in connection with FIG. 2, the interferometer 115 separates the object image at the focal point 180 into two focused images 420, 425, which are separated by the adjustable distance 240.

Light reflected from the reflective reticle 105' retraces the light incident thereon back toward the second beam splitter 410 after being recombined by the interferometer 115. The second beam splitter 410 reflects the recombined light from the interferometer 115 toward the detector 140.

A filter 440, such as a pinhole spatial filter, is used to select the interference signal from the beams reflected from the second beam splitter 410. It should be noted that this phase measuring device 400 in reflection does not directly measure the phase shift introduced by transmission through the reticle. Rather, the size or depth of the step etched in the reticle surface is measured.

It is noteworthy that the phase measuring device 100 used with transmissive reticles can also be used with reflective reticles by adding the second beam splitter 410 and changing the location of the detector to receive beams reflected from the second beam splitter 410, similar to that shown in FIG. 5.

FIG. 6 shows another phase measuring device 500 used with transmissive reticles, where the working distances of the microscope objectives are sufficient to accommodate the thickness of the transmissive reticle 105. As compared to FIG. 2, the phase measuring device 500 of FIG. 6 has duplicate optics in the detector system to recombine the images and record their interference on the detector 140.

In particular, in addition to all the elements shown in FIG. 2, the phase measuring device 500 of FIG. 6 has a second microscope or lens 135' to receive light beams passing through the reticle 105. The second microscope 135' direct light through a second common path interferometer 115' having identical elements as the first interferometer 115, namely, a partially reflecting and transmitting mirror 205' and two reflectors 210', 215'. The second interferometer 115' directs the light to the photo-detector 140 through a second imaging lens 185' and a second focusing lens 175'. The light between the second imaging lens 185' and a second focusing lens 175' passes through a focal point 180'.

The above described phase shift measuring devices simultaneously allow deep ultra-violet (DUV) transmission and have a high numerical aperture (NA) in order to measures phase shifts of sub-micron phase shift areas of a reticle.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A device to measure a phase shift of a step in a reticle comprising:
    a common path interferometer for receiving light from a light source and providing two point images separated from each other by an adjustable distance;
    a microscope having an objective for focusing said two point images to form two focused points along a reticle surface of said reticle;
    means for moving the reticle between first and second positions, wherein at said first position, light beams from said two focused points enter said reticle surface, and wherein at said second position, the light beams from said two focused points enter a step surface of said step; and
    a detector for receiving light from said reticle.

2. The device of claim 1, wherein said common path interferometer includes means for adjusting said adjustable distance so that the light beams from said two focused points overlap to form an overlapping light which substantially illuminates said detector.

3. The device of claim 1, wherein said common path interferometer includes two reflectors, said two reflectors being movable to change said adjustable distance.

4. The device of claim 1, wherein said common path interferometer includes a beam splitter for partially reflecting and partially transmitting the light from the light source; and two reflectors for reflecting light received from the beam splitter to each other and back to the beam splitter to form said two point images.

5. The device of claim 1, wherein said common path interferometer includes a cyclic beam splitter having a partially transmissive surface and first and second reflectors, said partially transmissive surface transmitting a first transmitted light to said first reflector, said first reflector reflecting said first transmitted light to said second reflector as a first reflected light, and said second reflector reflecting said first reflected light to said partially transmissive surface for transmission of one of said two point images.

6. The device of claim 1, wherein said common path interferometer includes a cyclic beam splitter having a partially reflective surface and first and second reflectors, said partially reflective surface reflecting a first reflected light to said first reflector, said first reflector reflecting said first reflected light to said second reflector as second reflected light, and said second reflector reflecting said second reflected light to said partially reflective surface for reflection of one of said two point images.

7. The device of claim 1, wherein said common path interferometer includes a cyclic beam splitter having a partially transmissive and reflective surface and first and second reflectors, said partially transmissive and reflective surface transmitting a first transmitted light to the first reflector, which reflects the first transmitted light to the second reflector as a first reflected light, and the second reflector reflecting the first reflected light to said partially transmissive and reflective surface for transmission to provide a first one of said two point images; and said partially transmissive and reflective surface partially reflecting a third reflected light to the second reflector, which reflects the third reflected light to the first reflector as a fourth reflected light, and the first reflector reflecting the fourth reflected light to said partially transmissive and reflective surface for reflection to provide a second one of said two point images.

8. The device of claim 1, wherein said reticle is transmissive.

9. The device of claim 1, further comprising at least one lens located between said common path interferometer and said light source.

10. The device of claim 1, wherein said light source is a laser.

11. The device of claim 1, further comprising a pellicle located between said reticle and said microscope.

12. The device of claim 1, wherein a numerical aperture of said objective required to spatially resolve the phase shift of the step is reduced by the moving means.

13. A device to measure a phase shift of a step in a reticle comprising:
    a first common path interferometer for receiving light from a light source and providing a first set of two point images separated from each other by an adjustable distance;
    a first lens for focusing said first set of two point images to form a first set of two focused points along a reticle surface of said reticle;
    means for moving the reticle between first and second positions, wherein at said first position, light beams from said first set of two focused points enter said reticle surface, and wherein at said second position, the light beams from said first set of two focused points enter a step surface of said step;
    a second lens for focusing light passing through said reticle to a second set of two point images;
    a second common path interferometer for receiving light from said second set of two point images; and
    a detector for receiving light from said second common path interferometer.

14. A device to measure a phase shift of a step in a reflective reticle comprising:
    a common path interferometer for receiving light from a light source and providing two point images separated from each other by an adjustable distance;
    means for moving the reticle between first and second positions, wherein at said first position, light beams from said two point images enter said reticle surface, and wherein at said second position, the light beams from said two point images enter a step surface of said step; and
    a detector for receiving light from said reticle.

15. The device of claim 14, further comprising a beam splitter located between said common path interferometer and said light source for receiving reflected light beams reflected back from said reticle and recombined by said common path interferometer, said beam splitter directing the reflected light beams to said detector.

16. The device of claim 14, further comprising a filter located between said detector and said beam splitter.

17. The device of claim 16, wherein said filter is a pinhole spatial filter for selecting a desired interference signal.

* * * * *